J. T. QUIGLEY.
TIME COST METER.
APPLICATION FILED APR. 6, 1909.

1,220,273.

Patented Mar. 27, 1917.
3 SHEETS—SHEET 1.

Witnesses:

Inventor
JOHN T. QUIGLEY
by Miller & White
Attorneys

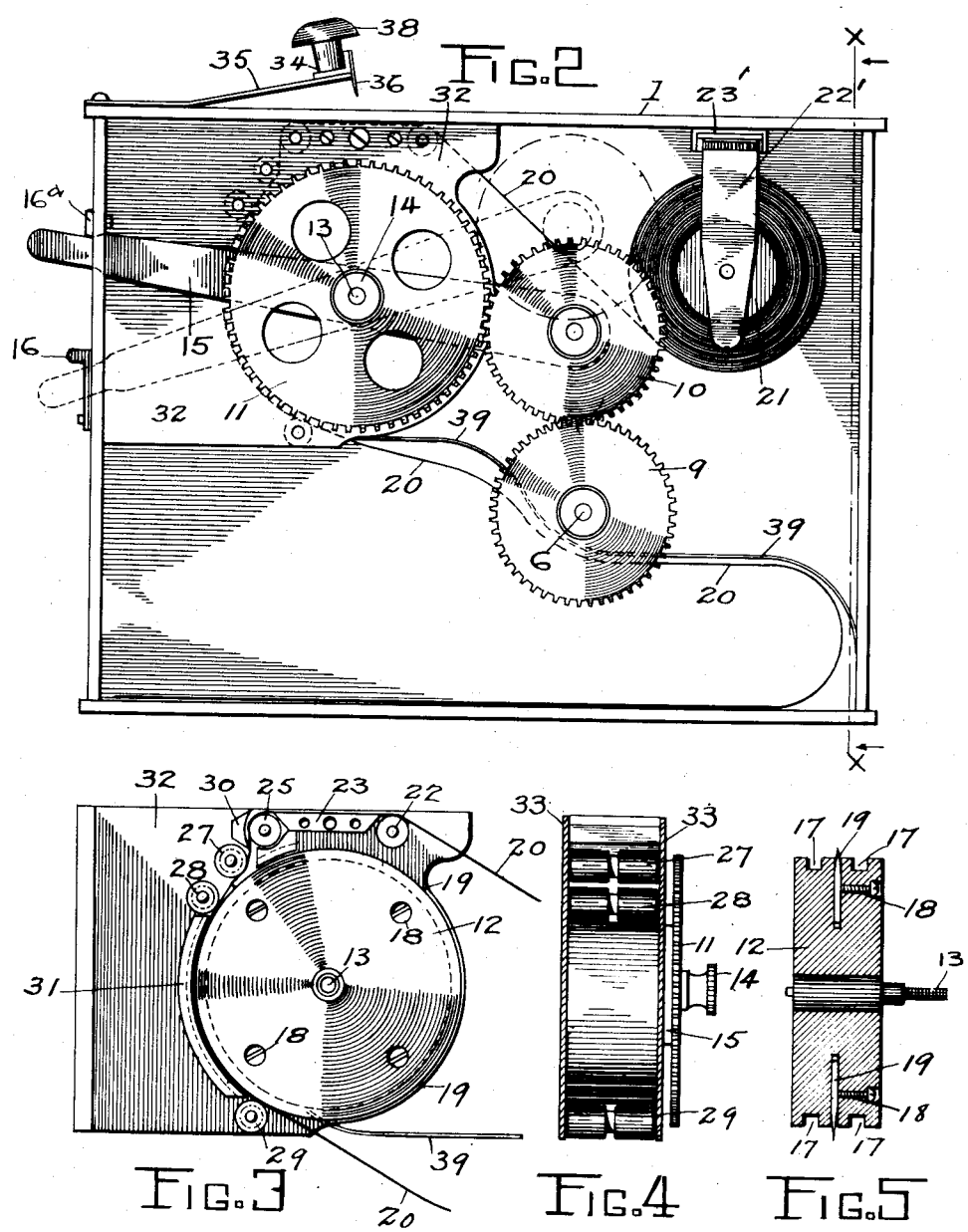

J. T. QUIGLEY.
TIME COST METER.
APPLICATION FILED APR. 6, 1909.

1,220,273.

Patented Mar. 27, 1917.
3 SHEETS—SHEET 3.

Witnesses:

Inventor
JOHN T. QUIGLEY
by Miller & White
Attorneys

UNITED STATES PATENT OFFICE.

JOHN T. QUIGLEY, OF SAN FRANCISCO, CALIFORNIA, ASSIGNOR, BY MESNE ASSIGNMENTS, TO COSTMETER COMPANY, OF BOSTON, MASSACHUSETTS, A CORPORATION OF MASSACHUSETTS.

TIME-COST METER.

1,220,273.  Specification of Letters Patent. Patented Mar. 27, 1917.

Application filed April 6, 1909. Serial No. 488,162.

*To all whom it may concern:*

Be it known that I, JOHN T. QUIGLEY, a citizen of the United States, and a resident of the city and county of San Francisco and State of California, have invented new and useful Improvements in Time-Cost Meters, of which the following is a specification.

The object of the invention is to provide a mechanism for registering automatically and synchronously the cost of elapsing time in terms of linear dimension.

The records of elapsed time and the cost of elapsed time obtained from the use of this invention differ from similar records obtained from the use of all prior elapsed time machines. The latter records are embodied in printed or written entries upon the record bearing material, whereas the records obtained from the use of my invention are embodied in the linear dimension of the record material.

The mode in which a machine embodying my invention records elapsing time also differs from the mode in which all prior elapsed time machines record elapsing time. In such latter machines no record of elapsing time is made until the end of the period recorded, whereas in my machine, the record is made synchronously with the passing of the time being recorded.

In and by means of this invention I substitute a mechanical computation of the time a person has spent in any employment or the cost of such time at such person's rate of compensation, in place of arithmetical calculation involving figuring or auditing written entries or records; and, in that connection, I provide novel means of indicating a work period of hours and fractional parts of an hour in units of linear measure together with means for converting or reducing such units of linear measure to units of money at the predetermined rate of compensation.

This invention, which I have termed a cost-meter, embodies time controlled mechanism operating on a web, tape or strip of paper, of indefinite length, continuously during a work period, with the effect of feeding, moving or advancing the tape at a speed per hour conforming to the controlling rate of compensation per hour so that the linear dimension of the tape so operated upon will form a record of the cost in wages of a given period of time, according to the adopted scale of linear measurement representing units of money.

The nature of this invention and the construction and mode of operation of a machine embodying the same is explained in the following description thereof, it being understood that various changes in form, proportions, size, and minor details of the structure may be made without departing from the spirit or sacrificing any of the advantages of the invention.

In the accompanying drawings Figure 1 is a perspective view of the complete machine, showing the doors in the casing opened.

Fig. 2 is a front elevation of the apparatus with the door removed to show the tape feeding mechanism.

Fig. 3 is a front elevation of the tape moving wheel or carrier and the device connected therewith for controlling the tape, whereby a positive movement of the tape, in time or relation to the movement of the wheel, is insured.

Fig. 4 is a side view of Fig. 3.

Fig. 5 is a transverse, vertical section taken diametrically through the tape carrier.

Similar numerals of reference are employed to indicate corresponding parts throughout the several figures of the drawings.

Figure 1:
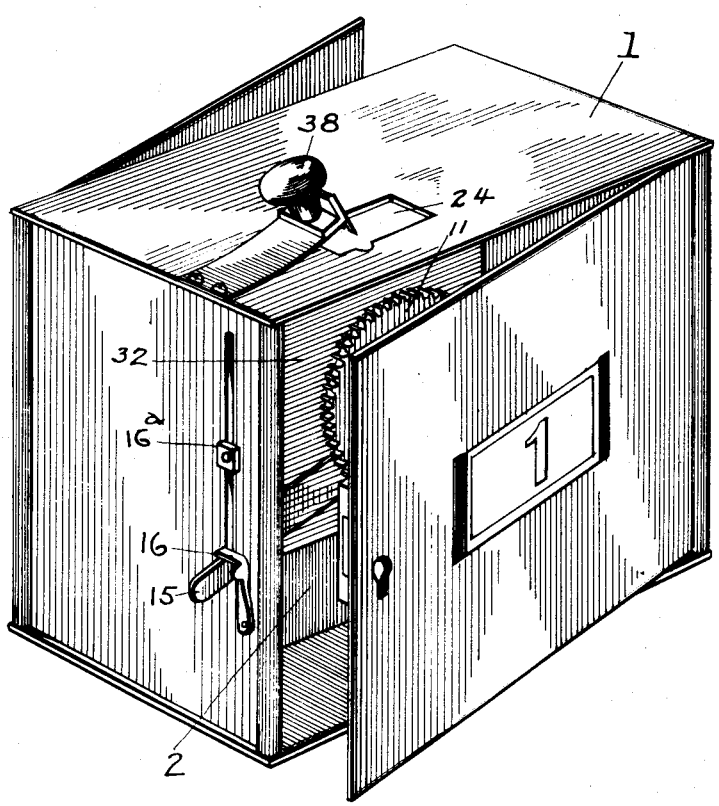
Figure 6:
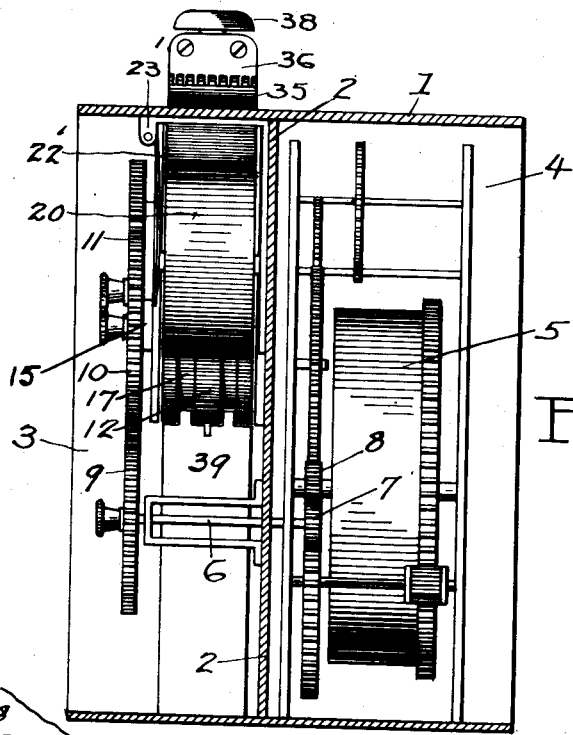
Fig. 6 is a vertical sectional view of the device illustrated in Fig. 2, the section being taken on the line $x$—$x$.
Figure 7:
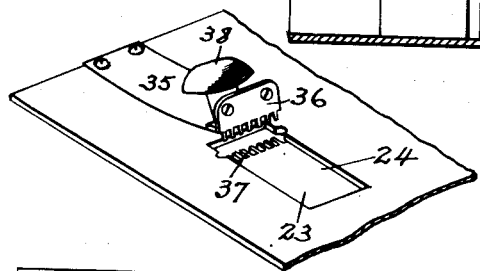
Fig. 7 is a perspective view in detail of the device for marking and perforating a line on the record tape at the opening in the top of the case under which the tape passes.
Figure 8:
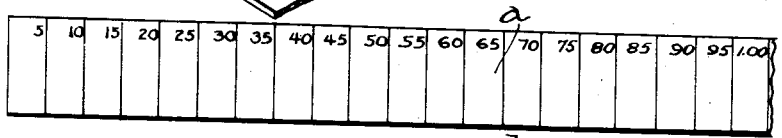
Fig. 8 illustrates a part of the linear money scale $a$ employed in connection with the cost-meter and in which the divisions represent units of money according to a predetermined linear unit, as here, for example, six inches represent one dollar.

The mechanism forming the subject-matter of the present invention is designed to be furnished to each operative, a record of whose time or the cost thereof is to be kept, and the working parts are mounted within a suitable casing 1 divided by the partition 2 into two chambers or compartments 3 and 4. The front and rear walls of the casing 1 are each hinged at one end to the respective end walls of the casing to form doors which may be held closed by latches or locks. By opening these doors access is had to chambers 3 and 4 respectively.

The chamber 3 contains the tape feeding mechanism and the chamber 4 contains the motor 5 employed in driving such mechanism. The motor is preferably a clock work constructed to run for several days with one winding thereof and sufficiently powerful to operate the tape feeding mechanism.

The tape feeding mechanism is connected with the clock work 5 through the arbor 6 extending through the partition 2 and having on its end a pinion 7 which engages the gear 8 of the clock work 5. The clock work being of a standard construction further description thereof is thought unnecessary.

The arbor 6, which is revolved once an hour, has at its other end the gear wheel 9 which drives the tape carrier 12 through the gears 10 and 11, which gear 11 is mounted on shaft 13 of the carrier wheel and secured thereto by the thumb screw 14. The intermediate gear 10, meshing with gears 9 and 11, is mounted on the movable arm 15, whose center of movement is coincident with the shaft 13. The outer end of the arm 15 extends through a slot in the end wall of the casing 1 and by depressing this end of the arm 15, the gear 10 is thrown out of mesh with the gear 9. The arm 15 is held in its depressed position by the latch 16, as indicated in dotted lines in Fig. 2. The stop 16ª on the outside of the casing is so placed that the arm 15 comes in contact therewith when the gears 9 and 10 are properly in mesh, and indicate this condition to the operator. The stop is vertically adjustable in the slot to allow contact with the arm 15, when gears of different sizes may be substituted for gear 9.

In the face of the tape carrier 12 are two circumferential grooves 17, and on the bearing face between these grooves are adjustably secured by screws 18 impaling points 19 extending radially from the face of the carrier 12 and so spaced as to insure at all times the impalement of the tape 20 on one or more of such points as it is being fed by the carrier.

The tape 20 is supplied from a spool 21 whose axle is carried by the partition 2 and the spring arm 22' hinged to its supporting bracket 23' attached to the top of the casing 1.

From the spool 21 the tape 20 is laid over the roller 22 across the platen 23, which is located under the aperture 24, in the top of the casing 1, then over the roller 25 and around the carrier 12 from which it is stripped by the end of the plate 39, which plate also acts as a guide to cause the tape to fall in folds on the floor of the chamber 3.

After passing under the aperture 24, the tape 20 is guided in its path by the rollers 27, 28 and 29 and the curved plate or guide 31. The rollers 27, 28 and 29 each have a circumferential groove to permit the impaling points 19 to pass. The roller 27 is set in sufficiently close relation to the face of the carrier 12 to slightly impale the tape upon the points 19. The rollers 28 and 29 are set in closer relation to the face of the carrier 12 and press the tape down on the points 19 and against the face of the carrier, thereby insuring a positive feed of the tape at the speed at which the face of the carrier moves. Since the tape 20 is stretched between the rollers 27 and 28 it will be apparent that it is always held in a fixed position at the same distance from the periphery of the drum 12 and that the angle at which the points 19 meet it is always the same.

The plate or guard 30 prevents the tape being moved forward under the aperture 24 independent of the movement of the carrier by an operative desiring to interfere with the feed of the tape at the speed of the carrier.

The carrier 12, the rollers 22, 25, 27, 28, 29, the guards 30 and 31 and the platen 23 are all inclosed in the casing 32 firmly attached by screws to one end of the casing 1 and to the partition 2. The sides 33 of the casing 32 provide bearings for the axles of the carrier and rollers and supports for the platen and guides.

On the top of the casing 1 and in working relation with the aperture 24 is located the perforator 34 consisting of the spring 35 attached at one end to the top of the casing 1 and having affixed to its other end the male die 36. The female die 37 is formed in the end of the platen 23. Attached to the spring 35 is the knob or button 38 by striking which the perforator is depressed and a transverse perforation of the tape is made. The point of such perforation being fixed, the perforation of the tape forms a datum line marking the beginning and ending of the record.

The speed at which the tape is moved by the carrier 12 is made conformable to the money scale $a$ and controlled and varied according to the wage rate per unit of time of the operative using the machine.

Such speed is controlled in the following manner: The circumference of the carrier 12 is equal to the linear unit representing one dollar in the money scale adopted. The gear 11 has two teeth for each hour of the working week. The gear 9 has two teeth for each dollar of the weekly wage rate it is desired to record. It will be seen, therefore, that a change of one tooth on the gear 11 will effect a change of half an hour in the length of the working week, and a change of one tooth on the gear 9 will effect a change of fifty cents in the weekly wage rate.

The manner of operating the machine is as follows: If the operative using the machine receives $24 for a 48 hour week, the gear 11 will have 96 teeth and the gear 9 will have 48 teeth. Upon commencing the morning work, the operative will release the arm 15, held depressed by the latch 16, and thereby bring the gear 10 into mesh with gear 9, thus starting the movement of the carrier 12. He will then strike the knob 38 to perforate the tape 20, after which he will write upon the tape exposed through the aperture 24 the number of the job he is working on, for example, job number 1634. Upon completing this job, he will again perforate the tape 20 and write the number of the next job on the exposed surface of the tape, for example, job number 1635. If the job (1634) consumed one hour and forty-five minutes, the gear 9 would in that time have made one and three-fourths revolutions and the carrier 12 seven-eighths of one revolution, thereby carrying past the perforating line, tape equal to seven-eighths of the carrier's circumference, or five and one-fourth inches, which, according to the money scale $a$ has a value of eighty-seven and one-half cents.

At the beginning of the noon hour and at the end of the day the tape is again perforated and the arm 15 depressed and held by the latch 16 to stop the feed of the tape.

The tape fed through the machine and deposited on the floor of the chamber 3 is separated from the unused tape at the last line of perforation and removed from the machine. It is then separated at its various lines of perforation dividing it into records of different jobs, and then such pieces of tape with the identifying job numbers thereon forming such records, may be applied to the money scale $a$ and their respective values determined or such pieces of tape may be respectively attached to or pasted on correspondingly numbered job scale sheets which have the money scale $a$ printed thereon for convenience in determining at a glance the total value of all tape attached to the sheet.

Each of said job scale sheets forms a permanent record of the cost of all time devoted to a job by the various operatives through whose hands the job has passed.

As the speed at which the tape is fed through the machine varies according to the wage rate of the operative using the machine and is also controlled by the unit of linear measure representing one dollar in the money scale adopted, it is apparent that the value, per unit of linear measure, of all tape collected from the machines used by the various operatives as above described, is the same.

It is obvious that this machine may be used simply for the purpose of recording elapsed time in terms of linear measure.

When so used, the speed at which the tape is moved, is made the same in the various machines used by any number of operatives, for example, three inches of tape in each machine being moved past the perforating line every hour. Likewise, when so used, the operative would perforate the tape and enter the job number thereon in the same manner, and tape, forming the record of the elapsed time devoted to the various jobs, would then be collected, separated and attached to the proper job sheets as described.

Figure 9:
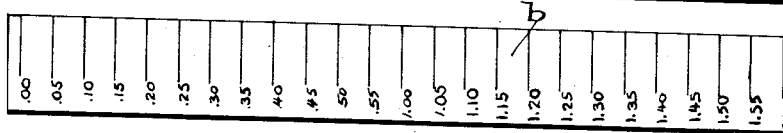
Fig. 9 illustrates a part of the linear time scale $b$ employed in connection with the cost-meter and in which the divisions represent units of time according to a predetermined linear unit, as here, for example, three inches represent one hour.
Figure 10:
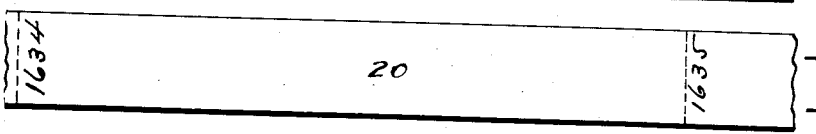
Fig. 10 represents a blank tape, having a character of surface suitable for receiving written entries and of a form convenient for measuring by the linear scale.

However, in connection with the machines so used, the time scales $b$ illustrated in Fig. 9, replace the money scales on the job sheets. These time scales, as shown, are graduated in units of hours and minutes conformable to the adopted linear unit of three inches representing one hour. By means of these job sheets with such time scales thereon, the elapsed time devoted to a job by any number of operatives through whose hands the job has passed, can readily be recorded in permanent form by attaching to the proper job sheet all the pieces of tape taken from the various machines used by such operatives and bearing the number of such job.

I claim:

1. In a time-cost meter, the combination of a casing with an aperture therein, a tape carrier for moving a tape under said aperture, provided with impaling points, rollers set at varying distances from the carrier having grooves in line with the impaling points, means for actuating the carrier and means for perforating a transverse line in the tape.

2. In combination, a tape carrier provided with impaling points projecting from its face to engage the tape rollers set at progressively shorter distances from the carrier for gradually impaling the tape upon said points, and means for actuating the carrier.

3. In a system for producing comparable records of time cost of different operations under different rates, the combination of a plurality of measuring machines each comprising a casing having a length determining member, clockwork mechanism for automatically feeding a tape relative to its length determining member, the rate of feed in each case being proportional to elapsing time and the characteristic rate of time cost for the operation being performed, and mechanical means associated with the machine for marking a length of tape with the length determining element.

4. In a system for producing comparable records of time cost of different operations under different rates, the combination of a plurality of impression surfaces, a length determining element for each, means for automatically feeding said impression surfaces each relative to its respective length determining element, the rate of feed in each case being proportional to elapsing time and the characteristic rate of time cost for the operation being performed, and means for applying the length determining element to the impression surface.

5. In a recording machine the combination with a casing and time controlled recording means for feeding a record sheet comprising a feeding and measuring member having an accurately dimensioned feeding surface against which the sheet is adapted to press into close fitting relation, and a plurality of impaling points projecting from its surface and adapted to penetrate a previously imperforate portion of the record sheet.

6. In a recording machine the combination with a casing and time controlled recording means for feeding a record sheet comprising a feeding and measuring member having an accurately dimensioned feeding surface against which the sheet is adapted to press into close fitting relation, and a plurality of fixed impaling points projecting from its surface and adapted to penetrate a previously imperforate portion of the record sheet.

7. In a recording machine the combination with a casing of time controlled recording means for feeding and measuring a record sheet, the same including a drum having an accurately dimensioned feeding surface, means for pressing into close fitting relation to the portion of the drum periphery with which it contacts and impaling points projecting from the drum surface and adapted to penetrate a previously imperforate portion of the record sheet.

8. In a recording machine, time controlled feeding means for feeding and measuring a record sheet, the same including a feeding drum having an accurately dimensioned feeding surface, impaling points projecting from the surface and adapted to penetrate a previously imperforate portion of the record sheet, and means for pressing the sheet into close fitting relation to the feeding periphery of the drum, said means being grooved to permit the passage of the impaling points.

9. In a recording machine time controlled feeding means for feeding and measuring a record sheet, the same including a feeding member provided with an accurately dimensioned feeding surface with which the recording sheet is adapted to have a close fitting relation, impaling points projecting from its surface and adapted to penetrate a previously imperforate portion of the record sheet, and one or more rollers for pressing the sheet into close fitting relation to the surface of the feeding member, said roller or rollers being grooved to permit the passage of the impaling points.

10. In a recording machine time controlled feeding means for feeding a record sheet, the same including a feeding member provided with a plurality of impaling points projecting from its surface and adapted to penetrate a previously imperforate portion of the record sheet, means for pressing the sheet into close fitting relation with the feeding surface of said member and means for stripping the record sheet therefrom.

11. In a recording machine, mechanism for accurately feeding and measuring a continuous record sheet or tape including a time controlled sheet feeding member having impaling points and adapted to penetrate a previously imperforate portion of the record sheet and means for pressing the sheet into close fitting relation to the surface of the member over a substantial extent of the same.

12. In a mechanism for feeding and measuring a paper sheet, the combination of a sheet feeding drum, impaling points projecting from the surface thereof, and means for holding the oncoming sheet always at a fixed angular relation to the impaling points at the moment of impaling.

13. In a mechanism for feeding and measuring a record sheet, the combination with sheet holding means, of a sheet feeding drum having impaling points, and means for holding the sheet always at a fixed distance from the center of the drum at the moment of impaling.

14. In a mechanism for feeding and measuring a record sheet, the combination with sheet holding means of a sheet feeding member having impaling points, and means for holding the sheet always at a fixed position in the path of an impaling point at the moment of impaling.

JOHN T. QUIGLEY.

Witnesses:
P. S. PIDWELL,
WM. K. WHITE.